United States Patent
Maus

(10) Patent No.: US 8,695,666 B2
(45) Date of Patent: Apr. 15, 2014

(54) PNEUMATIC TIRE

(75) Inventor: Peter Johann Cornelius Maus, Bullingen (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 1416 days.

(21) Appl. No.: 11/936,241

(22) Filed: Nov. 7, 2007

(65) Prior Publication Data
US 2009/0114333 A1 May 7, 2009

(51) Int. Cl.
*B60C 15/00* (2006.01)
*B60C 15/06* (2006.01)

(52) U.S. Cl.
USPC .................. 152/539; 152/543; 152/546

(58) Field of Classification Search
None
See application file for complete search history.

(56) References Cited

U.S. PATENT DOCUMENTS

| 4,093,014 | A | | 6/1978 | Tomoda et al. |
| 4,234,029 | A | | 11/1980 | Peter et al. |
| 4,235,274 | A | * | 11/1980 | Suzuki et al. .................. 152/527 |
| 4,609,023 | A | | 9/1986 | Loser |
| 4,842,033 | A | | 6/1989 | Nguyen |
| 6,260,597 | B1 | | 7/2001 | Miyazono |
| 6,352,090 | B1 | | 3/2002 | Rayman |
| 6,659,148 | B1 | | 12/2003 | Alie et al. |
| 6,877,538 | B2 | | 4/2005 | Scheuren |
| 6,962,183 | B2 | | 11/2005 | Ueyoko et al. |

FOREIGN PATENT DOCUMENTS

| JP | 59-75809 | * | 4/1984 |
| JP | 60088612 A | | 5/1985 |
| JP | 2004-345593 | * | 12/2004 |
| WO | WO 2008/074337 | * | 6/2008 |

OTHER PUBLICATIONS

English translation of JP 59075809, 1984.*

* cited by examiner

*Primary Examiner* — Justin Fischer
(74) *Attorney, Agent, or Firm* — David L King

(57) ABSTRACT

A pneumatic radial tire has a pair of opposing bead portions 14, each bead portion 14 has a bead core 23 and a bead apex 24; at least one carcass reinforcing ply 12 having radially oriented steel cords 22, the at least one carcass reinforcing ply 12 has a main portion 18 and two turnups 20, one turnup 20 extending from each end of the main portion 18 and having a terminal end 21, the carcass reinforcing ply main portion 18 extends between the opposing bead cores 23 and turnups 20 are located axially outward of the bead core 23 and a portion of the bead apex 24; and two pairs of steel cord reinforced chippers, one pair adjacent each turnup, each pair having one inner chipper 40 being adjacent and on an axially inner side of the turnup 20 and one outer chipper 30 being adjacent on an axially outer side of the turnup 20, the inner and outer chippers 40, 30 being adjacent the turnup 20 each have a terminal end 41, 31 extending radially outward of the terminal end 21 of the turnup 20.

13 Claims, 4 Drawing Sheets

PNEUMATIC TIRE

FIELD OF THE INVENTION

The present invention is directed to a pneumatic tire. More specifically, the present invention is directed to a pneumatic radial tire wherein the bead portion of the tire is designed for improved durability due to the configuration of the turn-up portion of the carcass reinforcing ply.

BACKGROUND OF THE INVENTION

Bead area durability is one of the concerns of the tire industry. A conventional tire bead portion 100 is illustrated in prior art FIG. 4. What is conventionally considered the main portion 104 of a carcass reinforcing ply extends radially inward toward the tire rim and is turned about an inextensible bead core 106 to form a carcass ply turnup 108. The carcass ply turn up 108 extends at a single angle μ relative to a radial line tangent to the axially outermost point of the bead core 106 and parallel to the tire equatorial plane.

Due to the configuration and nature of the radial carcass, when a tire is expanded, the main portion of the carcass is put under tension, pulling the carcass main portion 104 radially upward and the carcass turn up 108 radially inward. After inflation and during operation of the tire, when the tire is under deflection, the carcass ply is subject to bending forces and the carcass main portion 104 moves radially inward while the carcass turnup 108 moves radially and axially outward. During both tension and deflection, the rubber surrounding the carcass main portion 104 and the carcass turn up 108, due to the adhesion relationship between the rubber and the reinforcing cords of the ply, also is forced to move and the rubber is stressed. The movement of the carcass ply and the surrounding rubber may result in cracking of the rubber in the tire bead portion, decreasing durability of the tire.

Other attempts have been made to improve the durability of the bead portion. U.S. Pat. No. 6,260,597 (Miyazono) discloses a pneumatic tire having multiple organic fiber cord reinforced layers in the bead portions outward of a carcass ply. Axially outward of the carcass ply turnup, the terminal ends of the organic fiber layers are all at the same height or radially outward of the terminal end of the carcass ply turnup. Because the axially outer organic fiber layers are predominately radially outward of the carcass ply terminal end, when the bead portion is subjected to strain during operation, it is the organic fiber layer ends that are subjected to the greater load and where crack initiation may begin, resulting in reduced bead durability. Miyazono teaches that to improve durability, the ends of the organic fiber layers are bent in various different embodiments while the carcass ply turnup is maintained at a single angle.

Several prior art patents similarly propose applying textile cord layers adjacent the turnup ends of a pneumatic tire to improve durability as in U.S. Pat. No. 4,234,029 and U.S. Pat. No. 4,093,014 having a folded over U shaped chipper. U.S. Pat. No. 6,962,183 uses an axially outer short steel cord chipper terminating radially below the turnup end wherein both the chipper and the turnup end are covered by a nylon patch.

In U.S. Pat. No. 4,842,033 gum strips are proposed to cover the turnup ends to improve durability.

In U.S. Pat. No. 6,962,183 and U.S. Pat. No. 6,877,538 the use of an axially outer steel or organic cord reinforced chipper layer is taught wherein the outer end terminates below preferably well below the high ply turnup terminal end which is encased in insulation rubber.

All of these exemplary prior art patents where attempts to improve tire bead area durability and to reduce crack propagation which is a common issue in heavy duty commercial truck tires, particularly such tires using a steel reinforced carcass ply.

SUMMARY OF THE INVENTION

A pneumatic radial tire has a pair of opposing bead portions, each bead portion has a bead core and a bead apex; at least one carcass reinforcing ply having radially oriented steel cords, the at least one carcass reinforcing ply has a main portion and two turnups, one turnup extending from each end of the main portion and having a terminal end, the carcass reinforcing ply main portion extends between the opposing bead cores and turnups are located axially outward of the bead core and a portion of the bead apex; and two pairs of steel cord reinforced chippers, one pair adjacent each turnup, each pair having one inner chipper being adjacent and on an axially inner side of the turnup and one outer chipper being adjacent on an axially outer side of the turnup, the inner and outer chippers adjacent the turnup each have a terminal end extending radially outward of the terminal end of the turnup.

The inner chipper has the steel cords oriented on a bias angle in relative to a circumferential or radial plane of the tire and the outer chipper has the steel cords oriented in a bias angle opposite in direction relative to the inner chipper, the steel cords of the chippers are oriented on a bias angle in the range of 25 to 85 degrees. The steel cords of the inner and outer chippers are oriented preferably at equal but oppositely oriented bias angles. Each chipper has the steel cords arranged substantially parallel in the range of 8 to 15 ends per inch (3 to 6 ends per cm). Additionally, a second axially inner chipper having steel cords lying adjacent to and axially inward of the inner chipper, may be provided.

The pneumatic radial tire also has a belt reinforcement structure having three or more steel cord reinforced belt layers disposed radially outward of the at least one carcass reinforcing ply; and a tread radially outward of the belt reinforcing structure. Preferably, the axially outer chipper extends to a radially inner end extending between the bead core and a rim seating base of the bead portion, while the radially outer terminal end of the axially inner chipper extends outwardly by 5 mm or more relative to the terminal end of the axially outer chipper. The radially outer terminal end of the axially outer chipper also extends outwardly by 5 mm or more relative to the terminal end of the turnup. The axially inner chipper has a radially inner end extending toward the bead core terminating above a location of contact of bead core and the turnup. The pneumatic radial tire of the present invention is typically a commercial truck tire having nominal bead diameter of 22.5 inches (88 mm) or greater. In a second embodiment, two pairs of polyamide monofilament cord reinforced chippers may be used instead of chippers having steel cords. Also, the pneumatic radial tire may further be constructed having a top belt layer covering the at least three or more steel cord belt layers, the top belt having cords being made of nylon or polyamide.

DEFINITIONS

The following definitions are applicable to the present invention.

"Inner" means toward the inside of the tire and "outer" means toward its exterior.

"Outer" means toward the tire's exterior.

"Radial" and "radially" are used to mean directions radially toward or away from the axis of rotation of the tire.

"Tread" means a molded rubber component which, when bonded to a tire casing, includes that portion of the tire that comes into contact with the road when the tire is normally inflated and under normal load. The tread has a depth conventionally measured from the tread surface to the bottom of the deepest groove of the tire.

BRIEF DESCRIPTION OF THE DRAWINGS

The invention will be described by way of example and with reference to the accompanying drawings in which.

DETAILED DESCRIPTION OF THE INVENTION

Figure 1:
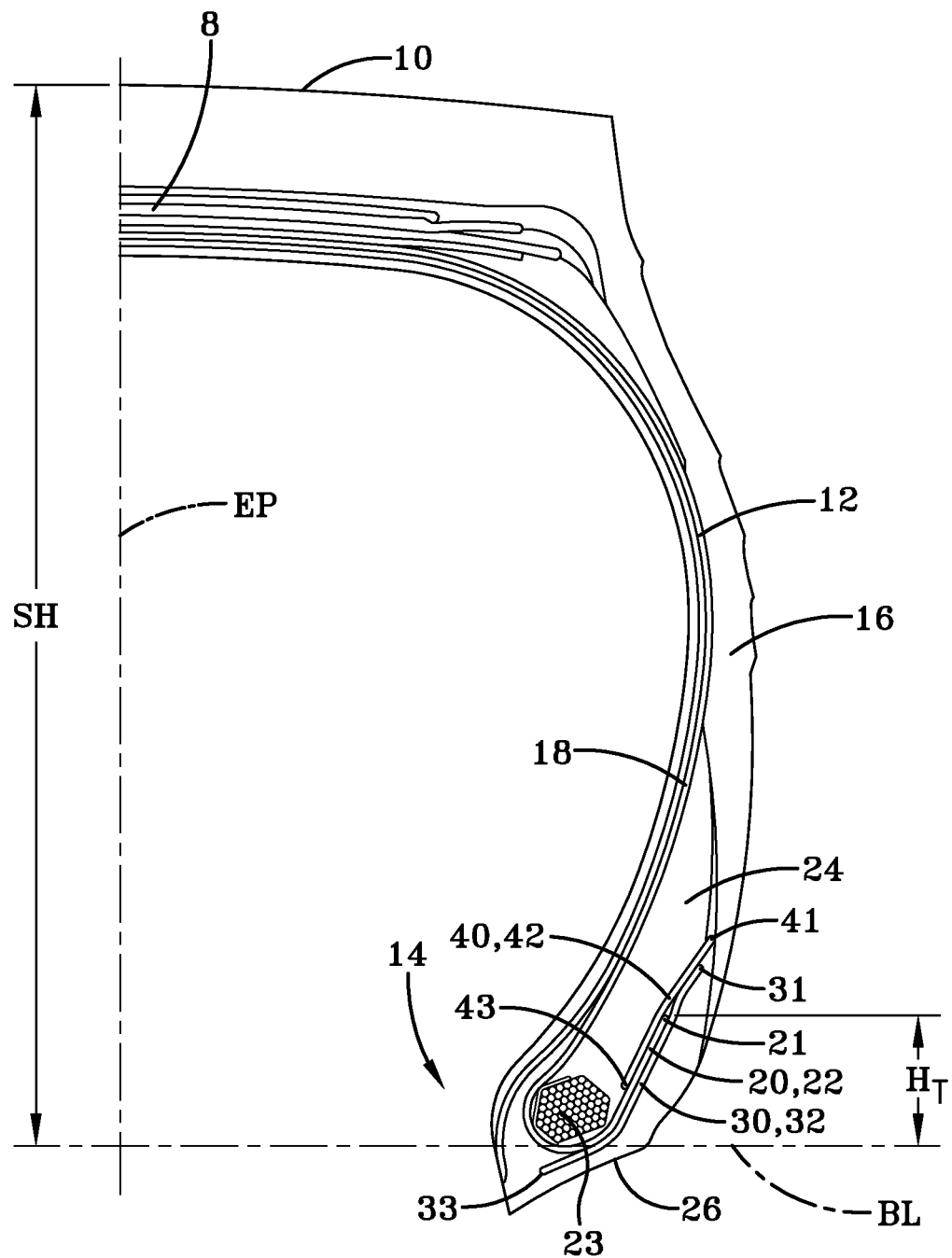
FIG. 1 is a cross-sectional view of half of a pneumatic tire.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employ basically the same components with variations in location or quantity thereby giving rise to the alternative constructions in which the inventive concept can be practiced.

Figure 2:
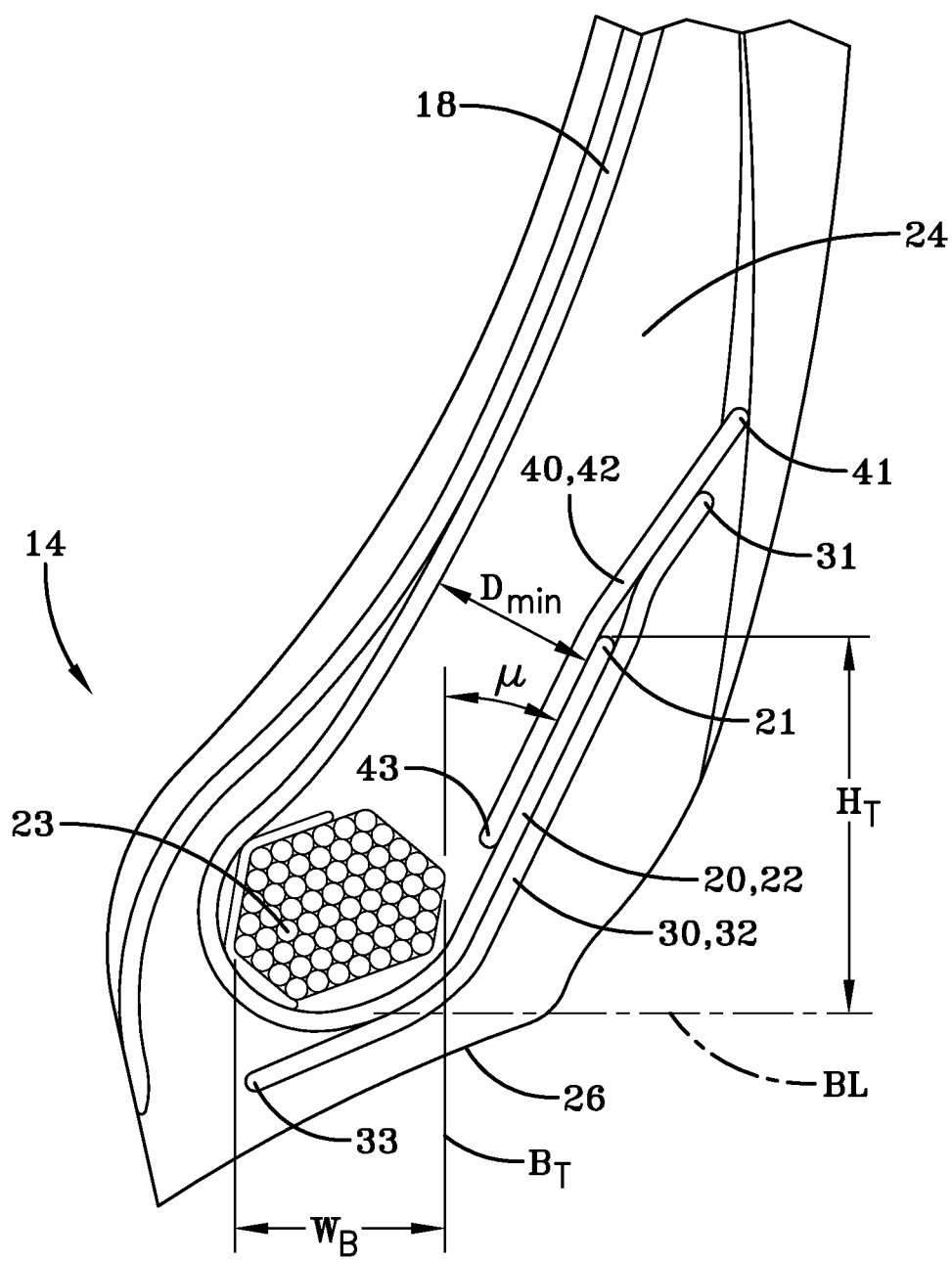
FIG. 2 is a close up of the bead portion of the tire of FIG. 1.

A pneumatic tire in accordance with a first embodiment of the present invention is illustrated in FIGS. 1 and 2. The pneumatic tire has a carcass, a belt structure 8 radially outward of the carcass, and a tread 10 radially outward of the belt structure 8. The belt structure 8 may be any of the type conventionally used for a pneumatic tire, and generally will include at least two reinforcement plies of angled, inclined cords and may include a ply of zero degree cords. The actual belt structure of the tire will be dictated by the intended end use of the tire. Similarly, the exact tread configuration will be dictated by the intended end use of the tire.

The carcass has at least one carcass reinforcing ply 12, a pair of opposing bead portions 14 and a pair of opposing sidewalls 16. The ply 12 has a main portion 18 extending through the opposing sidewalls 16 and two carcass turnups 20 initiating in the bead portions 14. Each carcass turnup 20 of the carcass reinforcing ply 12 extends from the main portion 18 of the carcass reinforcing ply 12, and is wrapped about a bead core 23 and a bead apex 24 in the bead portion 14; thus enveloping, at a minimum, the bead core 23 and the lower portion of the bead apex 24 in each bead portion 14. The carcass turnup 20 terminates at a distance $H_T$ from the tire bead base line BL; the distance $H_T$ is at least 20% of the section height SH. The tire bead base line BL is an imaginary line, perpendicular to the equatorial plane EP of the tire, from the intersection of the radially extending outer side of the bead portion and the bead base of the tire.

Outward of the carcass ply 12 in the bead portion 14 is a steel cord reinforced layer referred to as the axially outer chipper 30. The axially outer chipper 30 extends from axially inward of the bead core 23 to axially outward of the bead core 23, being turned up around the bead core 23 similar to the carcass ply 12. The radially outer end 31 of the outer chipper 30 terminates radially outward of the terminal end 21 of the turnup 20 of the carcass ply 12. The axially outer chipper 30 extends radially inwardly along and adjacent to the turnup 20 and wraps about a portion of the bead core 23 and the carcass ply 12 terminating at an axially inner end 33 between the bead core 23 and a nm seating bead base 26.

To reduce the effect of the shear forces acting on both the carcass main portion 18 and the turnup portion 20, the minimum distance $D_{min}$ between the carcass main portion 18 and the carcass turnup 20, as measured perpendicular to the EP, is not less than 50%, preferably not less than 75% of the maximum bead core width $W_B$ as measured perpendicular to the EP. Preferably, to maintain the spacing, the carcass turnup 20 also does not pass axially inward of a radial line BT that is tangent to the axially outermost point of the bead core 23 and parallel to the tire equatorial plane EP.

Outward of the main portion 18 of the carcass ply 12 in the bead portion 14 is another steel cord reinforced layer referenced to as the axially inner chipper 40. The axially inner chipper 40 extends from a radially inner end 43 located above and in close proximity to the bead core 23. The axially inner chipper 40 extends axially inward along and adjacent to the turnup 20 extending to a radially outer end 41 which extends radially outward of both the terminal end 21 of the turnup 20 and the radially outer end 31 of the axially outer chipper 30.

As shown in both FIGS. 1 and 2, the axially outer chipper 30 has the end 31 extending 5 mm or more beyond the terminal end 21 of the turnup 20, while the inner chipper 40 extends even further beyond both the terminal end 21 and the end 31 to an end 41 which extends at least 5 mm or more beyond the end 31. In this region the radially outer portions of the inner chipper 40 and the outer chipper 30 join creating an interlocking adjoining region just radially above the terminal end 21 of the ply turnup 20.

Both the inner and outer chippers 30, 40 are reinforced with substantially inextensible cords 32, 42. Preferably the cords 32, 42 are made of steel having a mesh of parallel cords between about 8 and 18 ends per inch, preferably between about 12 and 16 ends per inch. The wire cord gauge of each chipper is preferably between about 0.6 mm and 1.5 mm. The chipper cords 32, 42 are oriented at an angle of between about 25 degrees and about 85 degrees with respect to the radially oriented steel cords 22 that reinforce the ply 20, most preferably cords 32, 42 are oriented between 25 and about 45 degrees. Alternatively the cords 32, 42 can be made of a polyamide monofilament cord of any cross sectional shape such as round, oval or star. These polyamide cords 32, 42 although being a synthetic material are very strong and similarly substantially inextensible as compared to polyester or nylon cords.

Both chipper layers 30, 40 when assembled as shown preferably have generally equal, but oppositely oriented cord angles. By having the cord angles biased oppositely at the locations where the chipper 30 and 40 are joined causes the stresses that would normally tend to initiate a crack at the terminal end 21 of the ply turnup 20 absorbed first by the end 41 of the axially inner chipper 40 causing these shear stresses to progress radially inwardly to the area wherein the outer chipper 30 is joined to the inner chipper 40 causing the shear forces to be absorbed in both the chippers 30 and 40 directly above the turnup 20. This greatly lowers the shear forces absorbed by the turnup 20 while also providing a way in which the inner chipper 40, can in a disconnected way relative to the bead core 23, transfer the stress to the outer chipper 30 which is anchored between the bead core 23 and bead base 26 without unduly loading the turnup 20. Textile or otherwise high elongation cords used to protect the turnup 20 could not absorb nor transfer the shear stresses in such an efficient manner. The stretching of such textile cords would simply cause the turnup 20 when reinforced with steel cords 22 to absorb the shear forces and the typical cracking in this area of the bead 14 would continue to occur.

An important feature of the present invention is the fact that the initial forces are absorbed by the inner chipper 40 because of its end 41 extending above the end 31. This structure insures the inner chipper 30, unanchored by the bead core 23, takes the initial shear stresses caused by deflection of the tire. Attempts to extend the end 31 of the outer chipper 30 to the same height or beyond the end 41 of the inner chipper 40 would have caused the anchored outer chipper 30 to take the initial shear stress and its end 31 would initiate a crack propagation due to the stiffness of the steel or polyamide cords 32 being anchored at the bead core 23. The present invention insures the stresses due to deflection of the tire are first taken in the longer end 41 of the chipper 40.

Figure 3:
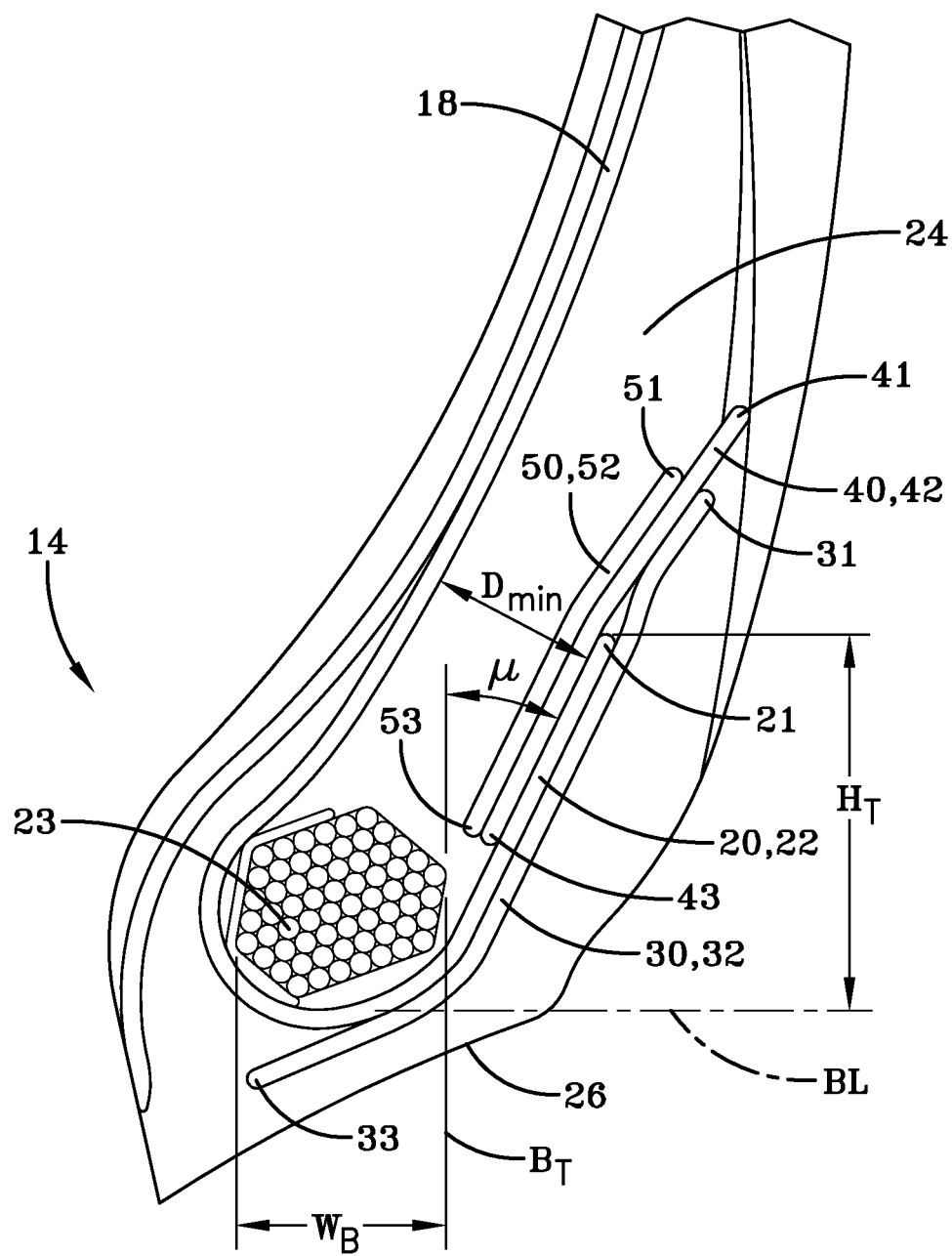
FIG. 3 is an alternative bead portion construction.
Figure 4:
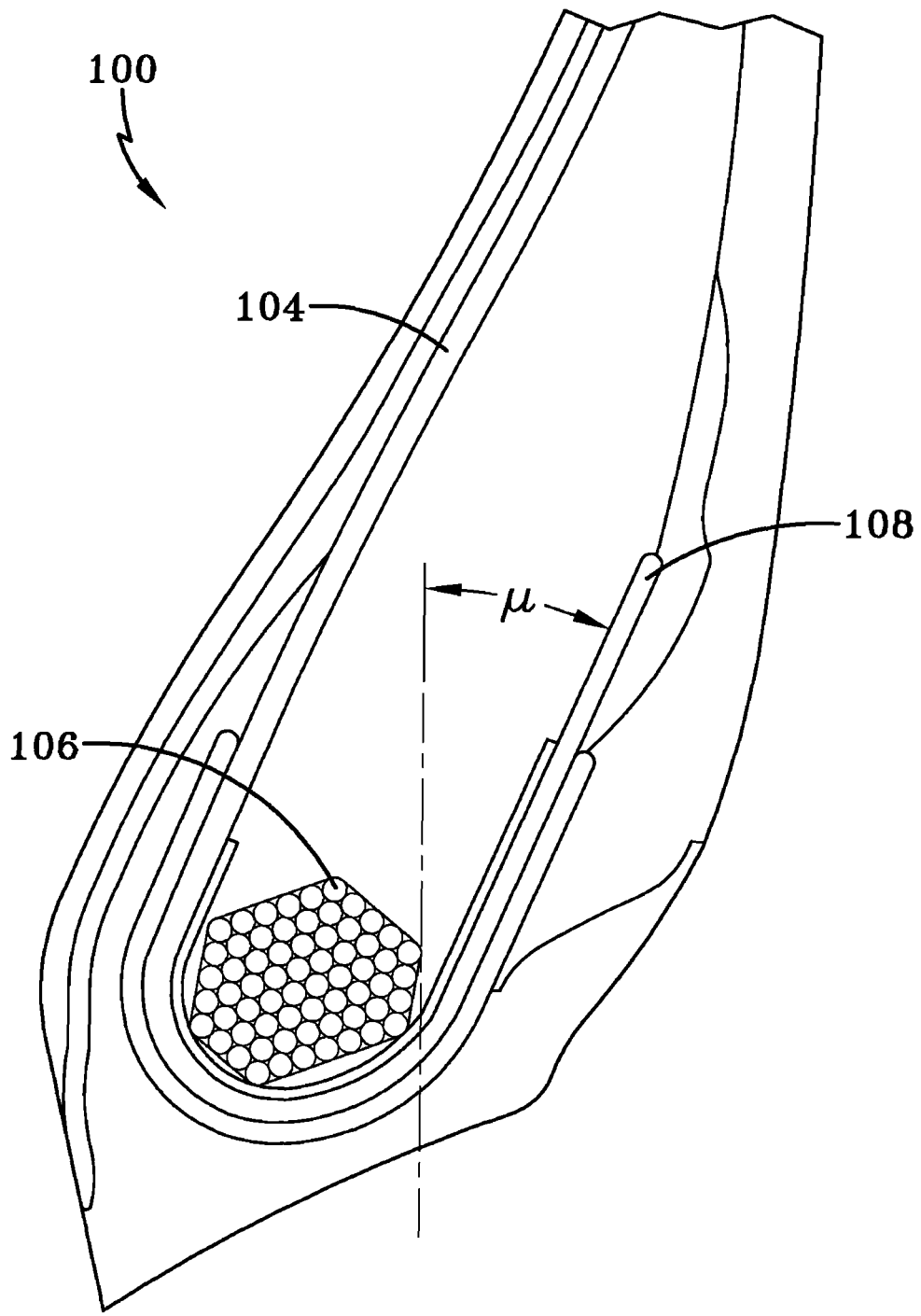
FIG. 4 is a prior art tire bead.

With reference to FIG. 3 an alternative embodiment bead portion 14 is shown wherein an additional second inner chipper 50 is added to the bead portion 14. The second chipper 50 has a radial outer end 51 and radial end 53 lying adjacent next to the inner chipper 40. The second inner chipper 50 has steel or polyamide cords 52 oriented on a bias angle preferably equal but opposite to the cords 42 of the inner chipper 40. In this alternative embodiment the added chipper 50 increases the stiffness of the bead portion 14 inward of the ply turnup 20 to further insure the transfer of shear stresses along both the inner chippers 40, 50 and outer chipper 30.

In each of the present tire construction, the primary advantage is increasing bead durability under heavy loads or high heat conditions as is seen in commercial vehicles such as buses, tractors and medium commercial truck tires designed for heavy loads. Such tires typically have large rim diameters of 22.5 inches (88 mm) or greater and are designed to be retreaded such that the bead portions of the carcass may be exposed to many hundreds of thousand miles. The ability to provide a more durable bead portion as is accomplished by the present invention provides a more reliable longer lasting carcass.

As shown by sandwiching the ply turnup 20 between the chippers 30 and 40 or optionally, also chipper 50, the present invention has been shown to enable the bead area to actually be made slightly lighter in weight which helps reduce hear build up. In a preferred embodiment the main portion 18 of the ply 12 preferably has a ply line approximately a neutral ply path to further help reduce shear forces on the ply 12. Experimental testing has shown the bead portions 14 employing the chippers 30, 40 provide a cool running tire with lower shear stresses along the ply turnup 20 evidencing greatly improved bead area durability with a much lower probability of end cracking along the ply turnup terminal end 21.

The tire of the present invention has an improved life and improved bead durability. The teachings herein are applicable to a broad range of tires and may be useful in tire lines such as, but not limited to, passenger tires, radial medium truck tires, aircraft tires, and off-the-road tires. The teachings may also be useful in improving bead durability for run-flat tires of any type.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic radial tire, the tire comprising:
   a pair of opposing bead portions, each bead portion has a bead core and a bead apex
   at least one carcass reinforcing ply having radially oriented steel cords, the at least one carcass reinforcing ply has a main portion and two turnups, one turnup extending from each end of the main portion and having a terminal end, the carcass reinforcing ply main portion extends between the opposing bead cores and the turnups are spaced axially outward from the main portion located axially outward of the bead core and a portion of the bead apex; and
   two pairs of steel cord reinforced chippers, one pair adjacent each turnup, each pair having one inner chipper being adjacent and on an axially inner side of the turnup, the inner chipper extending from a radial end located above and in close proximity to the bead core and being unanchored to the bead core and one outer chipper being adjacent on an axially outer side of the turnup and extending from an axially inner end axially inward of the bead core to axially outward of the bead core, being turned up around the bead core and the carcass ply and anchored to the bead core, the combination of the inner and outer chipper are spaced from the main portion of the carcass reinforcing ply and sandwiching the turnup between the inner and outer chipper, the inner and outer chippers adjacent the turnup extend above the turnup where the inner and outer chippers are joined, each chipper has a terminal end extending radially outward of the terminal end of the turnup causing shear forces to be absorbed in both inner and outer chippers where joined directly above the turnup, and the terminal end of the inner chipper extending beyond the terminal end of the outer chipper and wherein the inner chipper being unanchored to the bead core and joined to the outer chipper above the turnup transfers shear stresses to the anchored outer chipper where joined to the inner chipper above the turnup end of the ply, and wherein the axially inner chipper and axially outer chipper are reinforced by cords of equal, but oppositely oriented cord angles, the cords being inextensible and stiff to insure initial shear stress due to deflection are first taken in the longer end of the axially inner chipper transferred to both inner and outer chippers where joined above the ply turnup end progressing to the outer chipper without unduly loading the turnup due to the chipper cords stiffness and inextensible non-stretching characteristics.

2. The pneumatic radial tire of claim 1 wherein the adjacent inner chipper has the steel cords oriented on a bias angle in relative to a radial plane of the tire and the adjacent outer chipper has the steel cords oriented in a bias angle opposite in direction relative to the inner chipper.

3. The pneumatic radial tire of claim 2 wherein the steel cords of the chippers are oriented on a bias angle in the range of 25 to 85 degrees.

4. The pneumatic radial tire of claim 3 wherein the steel cords of the chippers are oriented at equal but oppositely oriented bias angles.

5. The pneumatic radial tire of claim 1 wherein each chipper has the steel cords arranged substantially parallel in the range of 8 to 15 ends per inch (3 to 6 ends per cm).

6. The pneumatic radial tire of claim 1 further comprises a second axially inner chipper having steel cords lying adjacent to and axially inward of the inner chipper.

7. The pneumatic radial tire of claim 1 further comprises:
a belt reinforcement structure having three or more steel cord reinforced belt layers disposed radially outward of the at least one carcass reinforcing ply; and
a tread radially outward of the belt reinforcing structure.

8. The pneumatic radial tire of claim 1 wherein the axially outer chipper extends to a radially inner end extending between the bead core and a rim seating base of the bead portion.

9. The pneumatic radial tire of claim 1 wherein the terminal end of the axially inner chipper extends outwardly by 5 mm or more relative to the terminal end of the axially outer chipper.

10. The pneumatic radial tire of claim 9 wherein the terminal end of the axially outer chipper extends outwardly by 5 mm or more relative to the terminal end of the turnup.

11. The pneumatic radial tire of claim 1 wherein the turnup is inclined along an angle $\alpha$ relative to the equatorial plane of the tire from above the bead core outwardly.

12. The pneumatic radial tire of claim 1 wherein the axially inner chipper has a radially inner end extending toward the bead core terminating above a location of contact of bead core and the turnup.

13. The pneumatic radial tire of claim 1 wherein the tire is a commercial truck tire having nominal bead diameter of 22.5 inches (88 mm) or greater.

* * * * *